United States Patent [19]

Emmenegger

[11] 3,844,404
[45] Oct. 29, 1974

[54] COVERED OVERLAND CONVEYOR
[75] Inventor: Russell E. Emmenegger, Sappington, Mo.
[73] Assignee: Conveyor Covers Incorporated, St. Louis, Mo.
[22] Filed: Aug. 16, 1972
[21] Appl. No.: 281,102

[52] U.S. Cl.............................. 198/204, 198/192 A
[51] Int. Cl............................................. B65g 15/60
[58] Field of Search............ 198/192 R, 192 A, 191, 198/184, 204

[56] References Cited
UNITED STATES PATENTS
| 2,921,668 | 1/1960 | Risse | 198/184 |
| 2,955,702 | 10/1960 | Long et al. | 198/204 |
| 3,147,852 | 9/1964 | Hanson | 198/204 |

FOREIGN PATENTS OR APPLICATIONS
| 1,160,573 | 8/1969 | Great Britain | 198/204 |
| 1,186,674 | 4/1970 | Great Britain | 198/192 R |
| 846,986 | 9/1960 | Great Britain | 198/204 |

Primary Examiner—Evon C. Blunk
Assistant Examiner—Douglas D. Watts
Attorney, Agent, or Firm—Gravely, Lieder & Woodruff

[57] ABSTRACT

An overland coveyor has arch-like supports from which a pair of horizontal wire ropes are suspended. The wire ropes extend the entire length of conveyor adjacent to the sides of the supports and carry idler assemblies which in turn support an endless belt such that the belt extends through the arch-like supports. A cover is attached directly to the arch-like supports to prevent conveyed pulverulent material from blowing off of the belt.

2 Claims, 4 Drawing Figures

COVERED OVERLAND CONVEYOR

BACKGROUND OF THE INVENTION

This invention relates in general to conveyors and in particular to the type of conveyor used to transport materials for relatively long distances over land.

One of the most economical systems for transporting raw materials is the so-called overland conveyor. These conveyors, which may extend up to several miles in length, are currently used to transport a wide variety of raw materials such as sand, limestone, coal, and various ores. For example, an overland conveyor may be used to transport coal from a mine to a rail head or directly to an electric power plant. Usually the raw material contains a significant amount of fines which are easily blown off of the conveyor unless the conveyor is equipped with a cover. Hence, from the standpoint of ecology, it is desirable to cover overland conveyors.

Overland conveyors of current construction include successive pairs of upright pipe stands with each pair being mounted on a foundation which is usually a railroad tie. The pipe stands support wire ropes which in turn carry a succession of idler assemblies over which an endless belt is trained. If the conveyor is further equipped with a cover, that cover will usually be attached to and carried by the wire ropes also. Since the wire ropes carry practically the entire conveyor assembly, they are heavily loaded, and must be supported at relatively close intervals. Normally, the pipe stands which support the wire ropes are spaced about five feet apart.

SUMMARY OF THE INVENTION

One of the principal objects of the present invention is to provide an overland conveyor which is simple in construction, economical to manufacture, and easy to construct. Another object is to provide a conveyor of the type stated which is enclosed by cover with the cover being supported directly on the supports for the wire rope and not on the wire ropes themselves. A further object is to provide a conveyor which requires relatively few supports compared with conveyors of current construction. These and other objects and advantages will become apparent hereinafter.

The present invention is embodied in a conveyor having arch-like supports through which the conveyor belt runs. The invention also resides in the supports themselves. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
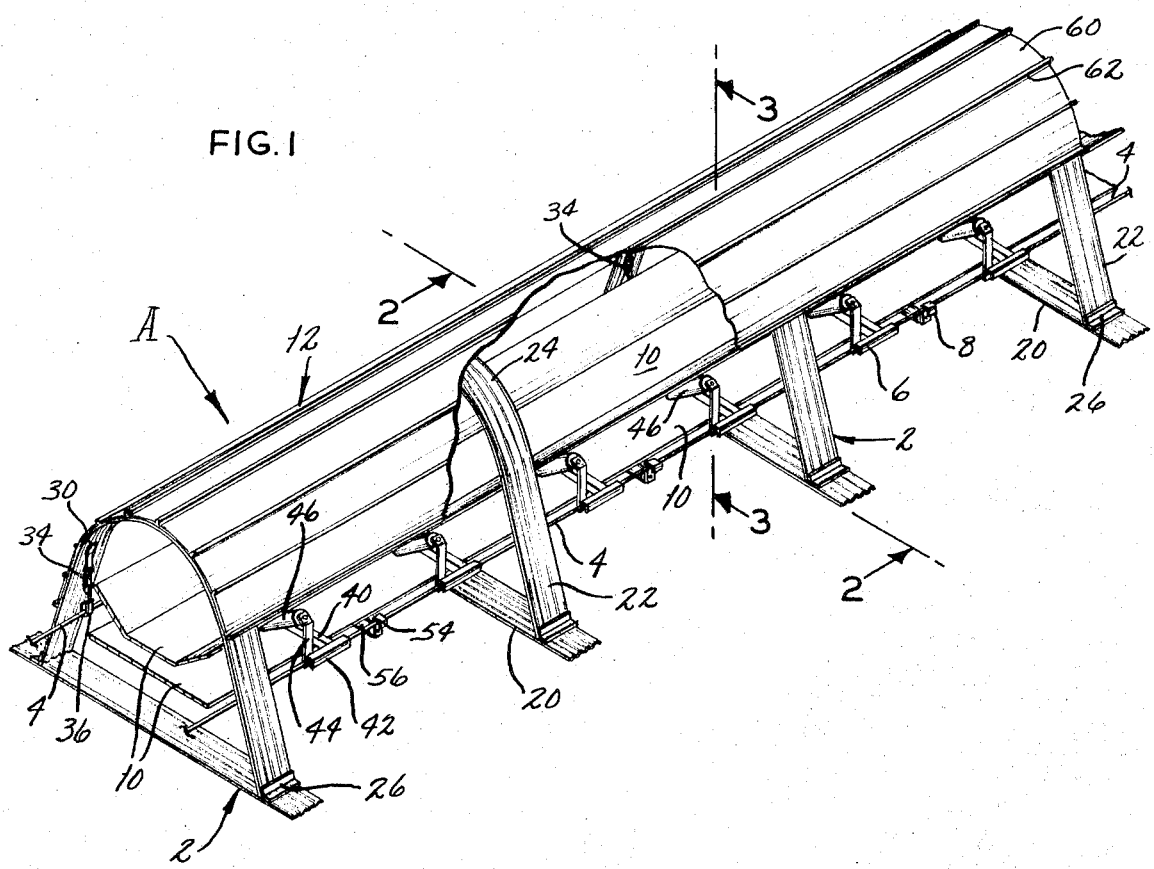
FIG. 1 is a perspective view, partially broken away, of a conveyor constructed in accordance with and embodying the present invention.

Referring now to the drawings, (FIG. 1), C designates an overland conveyor which may extend up to several miles in length and may be used to transport a wide variety of finished products and/or raw materials such as sand, limestone coal, and various ores. Broadly speaking, the conveyor C includes a plurality of standards or supports 2, a pair of wire ropes 4 suspended from the supports 2 along the sides thereof, upper and lower idler assemblies 6 and 8, respectively, carried by the wire ropes 4, an endless belt 10 trained over and supported by the idler assemblies 6 and 8, and a cover 12 attached to the supports 2 and extended over the upper pass of the belt 10 to prevent pulverulent material from being blown off off of the belt 10.

The supports 2 possess an arch-like configuration and are preferably fabricated from corrugated steel. They are quite strong and consequently may be spaced relatively far apart. Indeed, in a typical application the spacing between adjacent supports may be 10 ft.

Each support 2 includes (FIG. 2) a base 20 which rests directly on the terrain and preferably is formed from corrugated steel. Secured to the base 20 inwardly from the ends thereof are upstanding legs 22 which at their upper ends merge into an arcuate connecting portion 24, so that each support 2 has an arch-like configuration. The legs 22 and connecting portion 24 are formed from a single length of corrugated steel, the width of which is equal to the width of the base 20. Hence, the two legs 22 and the intermediate connecting portion 24 are integral. The legs 22, while being straight, are not parallel to one another, but on the contrary they upwardly converge. The convergence is such that the point of tangency between each leg 22 and the connecting portion 24 is located up to 15° above from the horizontal which passes through the center of curvature for the connecting portion 24. The legs 22 are preferably secured to the base 20 through transversely extending angles 26 with the angles 26 being welded to both the base 20 and the legs 22. However, the legs 22 may be welded directly to the base 20.

Welded to each support 2 at the points of tangency between the legs 22 and connecting portion 24 thereof are chain hangers 30 (FIGS. 2 and 3) having slotted apertures 32 (FIG. 3) through which chains 34 extend. Each aperture 32 at its upper end is generally circular and is large enough to enable the chain 34 to move freely through it. At its lower end the aperture 32 is slotted with the slot being wide enough and long enough to accommodate only one chain link. Consequently, when a link is disposed within the slotted lower portion of the aperture 32, the two links connected with that particular link will not pass through the aperture 32, and the chain 34 will be held fast. Of course, other links may be positioned in the slotted lower portion, merely by lifting the chain upwardly and passing it through the enlarged upper end of the aperture 32 until the desired link is reached. Hence, the elevation of the lower end of the chain 34 is adjustable. Attached to the lower ends of the chains 34 are hooks 36 which are sized to receive the wire ropes 4.

The wire ropes 4 extend horizontally the entire length of the conveyor A and rest in the hooks 36 at the ends of the chains 34. Hence, the wire ropes 4 are suspended from the supports 2 adjacent to the legs 22 thereof by means of the chains 34. Since the legs 22 are inclined outwardly from the arcuate connecting portion 24, the wire ropes 4 are positioned somewhat inwardly from the legs 22 (FIG. 2).

Figure 3:
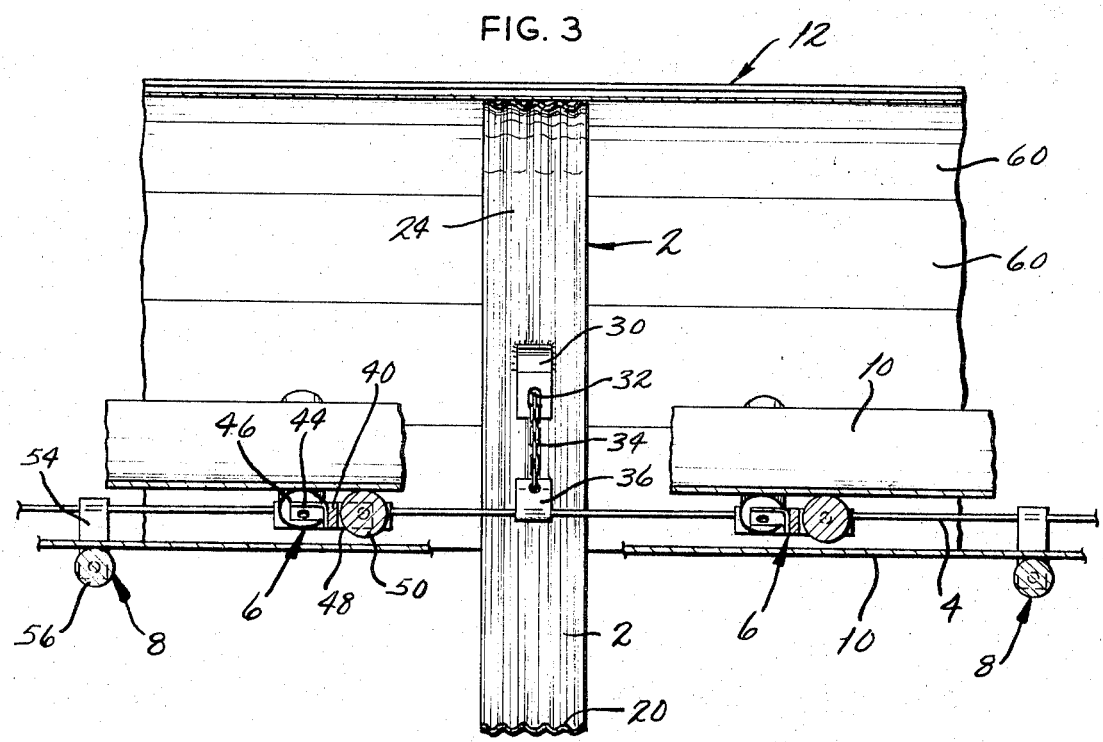
FIG. 3 is a sectional view taken along the line 3—3 of FIG. 1.
Figure 2:
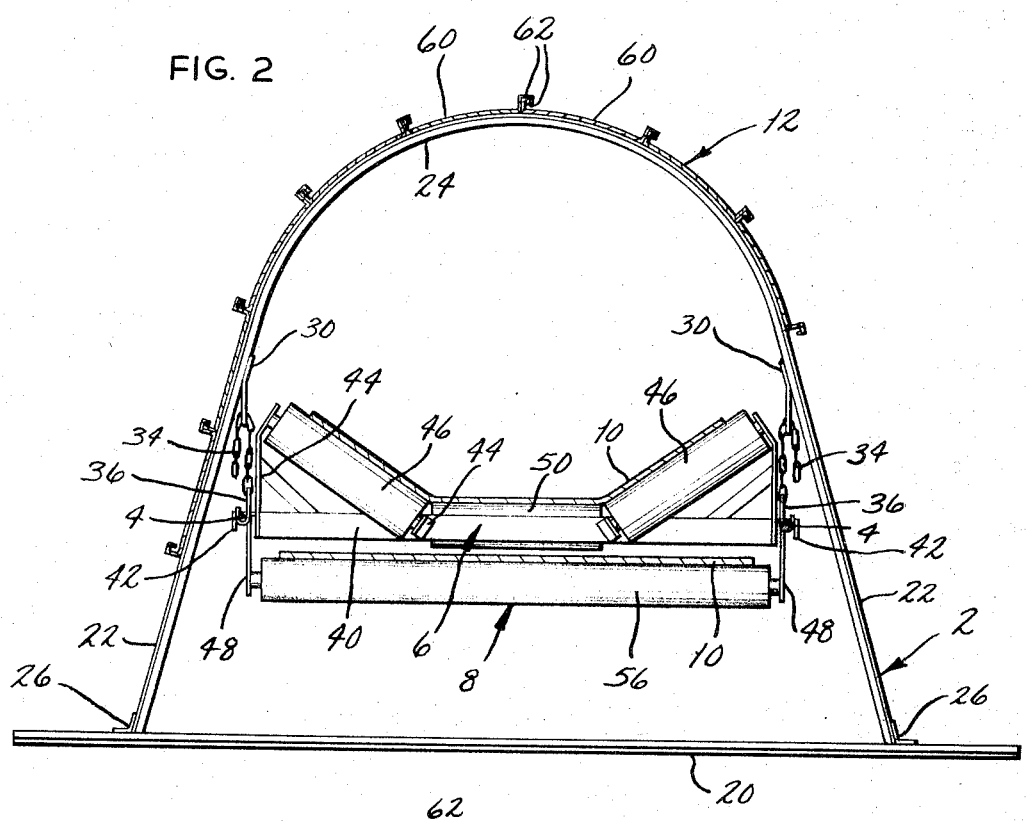
FIG. 2 is a sectional view taken along the line 2—2 of FIG. 1.

Both the upper idler assemblies 6 and the lower idler assemblies 8 are connected to and supported entirely by the wire ropes 4, spanning the space between those ropes 4 (FIG. 2). The upper idler assemblies 6 are spaced relatively close together inasmuch as they support the load carrying pass of the belt 10. The lower idler assemblies 8, on the other hand, support only the return pass of the belt 10 and are therefore spaced considerably further apart. Moreover, the lower assemblies 8 are offset relative to the upper assemblies 6 (FIG. 3).

The upper idler assemblies 6 are conventional in construction. Each includes (FIGS. 1–3) a cross bar 40 which extends between the two wire ropes 4 and has inverted channels 42 (FIG. 1) at its ends for receiving the wire ropes 4. Means are provided for clamping the channels firmly to the wire ropes 4 so that the upper idler assemblies 6 assumes a fixed position in the conveyor A. Welded to the cross bar 40 at the ends thereof are brackets 44 which support inclined side rollers 46. The cross bar 40 has more brackets 48 (FIG. 3) welded to it, and these brackets support a central roller 50 which is in a horizontal disposition at the lower ends of the inclined rollers 46 and is slightly offset from the inclined rollers 46. The conveying pass of flexible belt 10 rests upon the inclined and center rollers 46 and 48 of the upper idler assemblies 6, and owing to the position of those rollers 46 and 48, the belt 10 assumes a concave configuration.

Each lower idler assembly 8 includes (FIGS. 1–3) brackets 54 which attach to the wire ropes 4 and a single roller 56 which extends the entire width of the belt 10. The return pass of the belt 10 passes over and is supported by the rollers 56 of the lower idler assemblies 6.

The cover 12 rests on and is attached to the supports 2 to cover the conveying pass of the belt 10 in order to prevent the conveyed material from being blown off of it. The cover 12 extends (FIGS. 2) almost completely over the arcuate connecting portions 24 of the supports 2 and further extends down the legs 22 on one side of the conveyor A to a position below the conveying pass of the belt 10. On the other side of the conveyor A, the end of the cover 12 is located slightly above the legs 22 on that side to permit visual inspection of the load on the conveying pass. The cover 12 may consist of a plurality of elongated panels 60 positioned side-by-side over the supports and secured to the supports either by self-tapping drive screws or by bolts. The panels 60 may have interlocking side flanges 62 at their side edges. In other words, the flange 62 along the side of one panel will interlock with the flanges 62 along the edge of the adjacent panel 62 to form a rigid cover structure.

Figure 4:
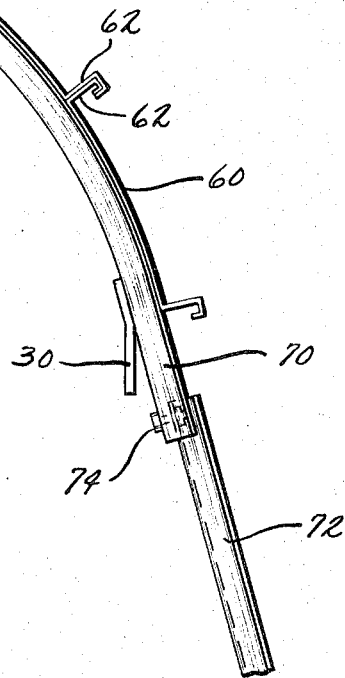
FIG. 4 is a fragmentary sectional view of a modified arch-like support forming part of the present invention.

In lieu of making supports 2 with the legs 22 and connecting portions 24 thereof as an integral one piece structure, each leg 22 may be formed with separate upper and lower sections 70 and 72 (FIG. 4) which can slide relative to each other when not otherwise connected. The upper section 70 merges into the arcuate connecting portion 24, whereas the lower section 72 is attached to the base 20. The two leg sections 70 and 72 overlap and where they overlap they are held together by bolts 74. These bolts 74 extend through elongated apertures in at least one of the overlapping sections so that when the bolts 74 are loosened the sections may be shifted relative to one another. This extends or retracts the legs 22, and provides height adjustment for keeping all of the arcuate connecting portions 24 in the conveyor A aligned. This in turn makes the supports 2 more adaptable to the terrain over which the conveyor A passes.

From the foregoing, it is apparent that the conveyor A is erected with relative ease and minimal expense; that it requires a minimal number of supports; that the wire ropes 4 are used to carry only the idler assemblies 6 and 8 and the belt 10 and not the cover 12, that no special foundations such as railroad ties are required for the arch-like supports 2; and that the supports 2 may be fabricated in a shop and then transported to the field.

This invention is intended to cover all changes and modifications of the example of the invention herein chosen for purposes of the disclosure which do not constitute departures from the spirit and scope of the invention.

What is claimed is:

1. A conveyor for transporting materials overland, said conveyor comprising: a succession of arch-like supports arranged such that the openings of succeeding arches in the supports align, each arch-like support including a base which extends the entire width of the support and rests on a supporting surface, spaced apart legs secured to the base at their lower ends and projecting upwardly therefrom, and a connecting portion connected rigidly to and extending between the upper ends of the legs to form a firm supporting structure between the legs, the legs of each arch-like support being inclined relative to each other and to the base such that they diverge away from the connecting portion and the connecting portion being curved such that the convex surface thereof is presented upwardly; a pair of cables extending through the arch-like supports above the bases and adjacent to the legs thereof; suspension means suspending the cables from the arch-like supports and being adjustable to vary the height of the cables above the base of the supports; first idler assemblies carried by the cables below the connecting portions of the arch-like supports, the idler assemblies spanning the space between the cables and having rollers thereon; second idler assemblies carried by the cables and also spanning the space between the cables, the second idler assemblies having rollers located below the rollers of the first idler assemblies; an endless belt extended through the arch-like supports above the base thereof and having an upper pass supported on the rollers of the first idler assemblies and a lower pass supported on the rollers of the lower idler assemblies; and a cover secured to and supported by the connecting portions of the arch-like supports, the cover being exposed outwardly to the atmosphere and being positioned to prevent material from being blown off of the upper pass of the belt, the cover extending over substantially all of the curved portions on the arch-like supports and downwardly along the legs at one side of the conveyor to a position below the upper pass of the belt, the other side of the cover terminating above the upper pass of the belt to permit visual inspection of material carried on the belt.

2. A conveyor for transporting materials overland, said conveyor comprising: a succession of arch-like supports arranged such that the openings of succeeding arches in the supports align, each arch-like support including a base which extends the entire width of the support and rests on a supporting surface, spaced apart legs secured to the base at their lower ends and projecting upwardly therefrom, and a connecting portion connected rigidly to and extending between the upper ends of the legs to form a firm supporting structure between the legs, the legs of each arch-like support being inclined relative to each other and to its base such that they diverge away from the connecting portion, the legs of each arch-like support further including overlapping upper and lower sections which are adjustable relative to each other to vary the height of the connecting portion above the base; a pair of cables extending through the arch-like supports above the bases and adjacent to the legs thereof; suspension means suspending the cables from the arch-like supports and being adjustable to vary the height of the cables above the bases of the supports; first idler assemblies carried by the cables below the connecting portions of the arch-like supports, the idler assemblies spanning the space between the cables and having rollers thereon; second idler assemblies carried by the cables and also spanning the space between the cables, the second idler assemblies having rollers located below the rollers of the first idler assemblies; an endless belt extended through the arch-like supports above the base thereof and having an upper pass supported on the rollers of the first idler assemblies and a lower pass supported on the rollers of the lower idler assemblies; and a cover secured to and supported by the connecting portions of the arch-like supports, the cover being exposed outwardly to the atmosphere and being positioned to prevent material from being blown off of the upper pass of the belt.

* * * * *